United States Patent
Hong et al.

(10) Patent No.: US 11,706,190 B2
(45) Date of Patent: Jul. 18, 2023

(54) SYSTEMS AND METHODS FOR IDENTIFYING SERVERS ON A RACK AND ASSIGNING THE PROPER IP ADDRESSES TO THE SERVERS BASED ON THEIR PHYSICAL LOCATIONS

(71) Applicant: Hitachi Vantara, LLC, Santa Clara, CA (US)

(72) Inventors: Francis Kin-Wing Hong, Chula Vista, CA (US); William Nguyen, San Jose, CA (US); Art Cruz, Sunnyvale, CA (US); Utkarsh Purushottam Wagh, Pune (IN); Yogesh Kandlikar, Milpitas, CA (US)

(73) Assignee: HITACHI VANTARA, LLC, Santa Clara, CA (US)

( * ) Notice: Subject to any disclaimer, the term of this patent is extended or adjusted under 35 U.S.C. 154(b) by 0 days.

(21) Appl. No.: 17/618,866

(22) PCT Filed: Jun. 17, 2019

(86) PCT No.: PCT/US2019/037521
§ 371 (c)(1),
(2) Date: Dec. 13, 2021

(87) PCT Pub. No.: WO2020/256691
PCT Pub. Date: Dec. 24, 2020

(65) Prior Publication Data
US 2022/0210115 A1 Jun. 30, 2022

(51) Int. Cl.
*H04L 61/5007* (2022.01)
*H04L 61/5038* (2022.01)
(Continued)

(52) U.S. Cl.
CPC ...... *H04L 61/5007* (2022.05); *H04L 61/5038* (2022.05); *H04L 61/5061* (2022.05); *H04L 2101/668* (2022.05); *H04L 2101/69* (2022.05)

(58) Field of Classification Search
CPC ............ H04L 61/5007; H04L 61/5038; H04L 61/5061; H04L 2101/69; H04L 2101/668
See application file for complete search history.

(56) References Cited

U.S. PATENT DOCUMENTS

| 7,340,538 B2 | 3/2008 | Alappat et al. |
| 2003/0105984 A1* | 6/2003 | Masuyama ............... G06F 1/26 713/330 |

(Continued)

FOREIGN PATENT DOCUMENTS

| CN | 107135269 A | 9/2017 |
| JP | 2004282119 A | 10/2004 |

(Continued)

OTHER PUBLICATIONS

Gite. "Linux Server Uptime Command To Find Out How Long The System Has Been Running." In: nixCraft. May 29, 2019 (May 29, 2019) Retrieved on Aug. 15, 2019 (Aug. 15, 2019) from <https://www.cyberciti.biz/faq/server-uptime-command-to-find-out-how-long-the-system-has-bee n-running/>.

(Continued)

*Primary Examiner* — Joseph L Greene
(74) *Attorney, Agent, or Firm* — Procopio, Cory, Hargreaves & Savitch LLP (57) ABSTRACT

Example implementations described herein are directed to systems and methods for managing internet protocol (IP) address assignment to servers on rack(s) based on their physical locations within the rack(s). Through the example implementations, the physical location of a server within a data center rack can be determined based on the IP address. Example implementations can involve issuing a ping local to (Continued)

determine a plurality of servers; retrieving power on time, current system time, and operating system (OS) uptime for each of the plurality of servers; determining a power on order for the plurality of servers; determining physical locations of the plurality of servers within one or more racks based on installation instructions and power on order; and assigning IP addresses to the plurality of servers based on the physical locations.

8 Claims, 8 Drawing Sheets

(51) Int. Cl.
*H04L 61/5061* (2022.01)
*H04L 101/69* (2022.01)
*H04L 101/668* (2022.01)

(56) References Cited

U.S. PATENT DOCUMENTS

| | | | |
|---|---|---|---|
| 2005/0125575 | A1 | 6/2005 | Alappat et al. |
| 2005/0262218 | A1* | 11/2005 | Cox ................... H04L 61/5014 709/217 |
| 2010/0289620 | A1 | 11/2010 | Aminger et al. |
| 2011/0075590 | A1 | 3/2011 | Kormann et al. |
| 2013/0290763 | A1* | 10/2013 | Katsumata ............. G06F 11/28 713/330 |
| 2014/0006597 | A1 | 1/2014 | Ganguli et al. |
| 2018/0343231 | A1* | 11/2018 | Terajima ............. H04L 61/5076 |
| 2019/0141665 | A1* | 5/2019 | Kim ........................ F24F 11/50 |

FOREIGN PATENT DOCUMENTS

| | | | |
|---|---|---|---|
| JP | 2006135507 | A | 5/2006 |
| JP | 2010147553 | A | 7/2020 |

OTHER PUBLICATIONS

European Patent Office. European Search Report dated Sep. 8, 2022. European Application No. / Patent No. 19934123.1-1203 / 3942388 PCT/US2019037521. Name of Applicant: Hitachi Vantara LLC. English Language. 7 pages.

Japan Patent Office. Japanese Notice of Reasons for Refusal dated Jan. 4, 2023. Japanese Patent Application No. 2021-571746. English Language. 5 pages.

\* cited by examiner

| Server serial number | Current system time | Power on time | Operating System time | System uptime |
|---|---|---|---|---|
| Server1 | CST1 | POT1 | OST1 | UP1 |
| Server2 | CST2 | POT2 | OST2 | UP2 |
| ... | ... | ... | ... | ... |

FIG. 3(b)

| Rack | Slot number | Server serial number | Assigned IP address |
|---|---|---|---|
| Rack1 | Slot1 | Server1 | IP1 |
| | Slot2 | Server2 | IP2 |
| | ⋮ | ⋮ | ⋮ |
| Rack2 | Slot1 | Server3 | IP3 |
| | Slot2 | Server4 | IP4 |
| ⋮ | ⋮ | ⋮ | ⋮ |

SYSTEMS AND METHODS FOR IDENTIFYING SERVERS ON A RACK AND ASSIGNING THE PROPER IP ADDRESSES TO THE SERVERS BASED ON THEIR PHYSICAL LOCATIONS

BACKGROUND

Field

The present disclosure is related to server rack management, and more specifically, to assigning proper internet protocol (IP) addresses to servers in a server rack based on their physical locations.

Related Art

Using Domain Name System (DNS) or static Internet Protocols (IP) are examples of related art methods to assign IP addresses to deploy new servers in a data center. Often, support personnel need to know the IP addresses associated with the physical locations of the servers for hardware maintenance and provision. However, there is a problem in using DNS to sign IP addresses while deploying the new servers. When the DNS is used in assigning IP addresses in a deployment, the IP addresses and the physical locations of the servers are not managed automatically. Such deployments thereby require a system administrator to manually apply the static IP addresses on-site. This process is labor intensive and can potentially introduce human mistakes in the process as there is no way to determine the physical location of the server on the rack based on the assigned IP address.

In an example related art implementation, there is a solution to assign IP addresses based on a location of a shelf and a slot in a rack, such as described in U.S. Pat. No. 7,340,538. There also exists another related art solution to assign IP addresses to servers based on their particular geographical locations (e.g., rack, chassis, slot, etc.) as described in U.S. Patent Application U.S. 2005/0262218.

SUMMARY

However, example related art implementations for assigning IP addresses based on the location of a server tend to require extra hardware for facilitating such implementations. Example implementations described herein utilize a combination of known power on instructions for a data center technician in comparison with sequences of a power button pressed time and system uptime to confirm the correct server location. In this manner, the location of the server can be determined from the IP addresses without requiring extra hardware beyond the server to be installed in the rack.

Example implementations described herein involve the combination of a process with an autodiscovery function to eliminate the guess work of assigning IP addresses on the newly deployed servers. Through the use of example implementations described herein, the accuracy of managing servers in the data center can be improved while reducing the deployment time and support/maintenance effort.

In the common data center, IP addresses for servers are manually assigned by their physical locations on the rack for maintenance and support reasons. In example implementations described herein, there is a method and apparatus that utilizes protocols such as the RedFish protocol to auto-discover the servers and obtain the power button pressed time and the system uptime to determine the position of the server on a rack. Users power on the servers in the same sequence as they want to assign the IP addresses. The predefined IP address value is assigned incrementally based on the server power up sequence, with the smallest IP address value assigned to the first system that is powered up. The difference of power button pressed time between system uptime is used to confirm the server location. This data is then saved for further analytical work after firmware, drivers, and Basic Input/Output System (BIOS) upgrades.

Aspects of the present disclosure can include a method, which involves issuing an IPv6 Link-Local to determine a plurality of servers; retrieving power on time, current system time, and operating system (OS) uptime for each of the plurality of servers; determining a power on order for the plurality of servers; determining physical locations of the plurality of servers within one or more racks based on installation instructions and power on order; and assigning internet protocol (IP) addresses to the plurality of servers based on the physical locations.

Aspects of the present disclosure involve a computer program, storing instructions that involve issuing an IPv6 Link-Local to determine a plurality of servers; retrieving power on time, current system time, and operating system (OS) uptime for each of the plurality of servers; determining a power on order for the plurality of servers; determining physical locations of the plurality of servers within one or more racks based on installation instructions and power on order; and assigning internet protocol (IP) addresses to the plurality of servers based on the physical locations.

Aspects of the present disclosure can involve an apparatus managing a plurality of servers installed on one or more racks, the apparatus connected to the plurality of servers over a local area network (LAN), the apparatus involving a processor, configured to issue a ping IPv6 Link-Local over the LAN to determine the plurality of servers; retrieve power on time, current system time, and operating system (OS) uptime for each of the plurality of servers; determine a power on order for the plurality of servers; determine physical locations of the plurality of servers within one or more racks based on installation instructions and power on order; and assign internet protocol (IP) addresses to the plurality of servers based on the physical locations.

Aspects of the present disclosure can include a system, which involves means for issuing a ping local to determine a plurality of servers; means for retrieving power on time, current system time, and operating system (OS) uptime for each of the plurality of servers; means for determining a power on order for the plurality of servers; means for determining physical locations of the plurality of servers within one or more racks based on installation instructions and power on order; and means for assigning internet protocol (IP) addresses to the plurality of servers based on the physical locations.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations. "Server" and "server node" may also be used interchangeably.

Example implementations involve a series of process steps to identify the physical locations of the server, and use the web-based graphical user interface (GUI) of the deployment manager to guide the assigning the IP addresses to the servers. The IP assignment is based on the physical locations of each server in a rack.

In example implementations described herein, the power on sequence is used to automatically assign the pre-allocated IP addresses range.

In example implementations described herein, deployment manager auto-discovers the available servers in the network by using a combination of validations include; server model type, default login password, system firmware version, and BIOS version to select new servers. This process not only discovers the available brand-new servers and removed the possibility to override existing servers in production.

Through the example implementations described herein, the IP addresses can be assigned to servers based on their physical location, thereby removing the need to utilize additional specialized hardware to identify the position of the servers. Example implementations described herein can thereby be extended to any generic server, regardless of vendor.

Figure 1:
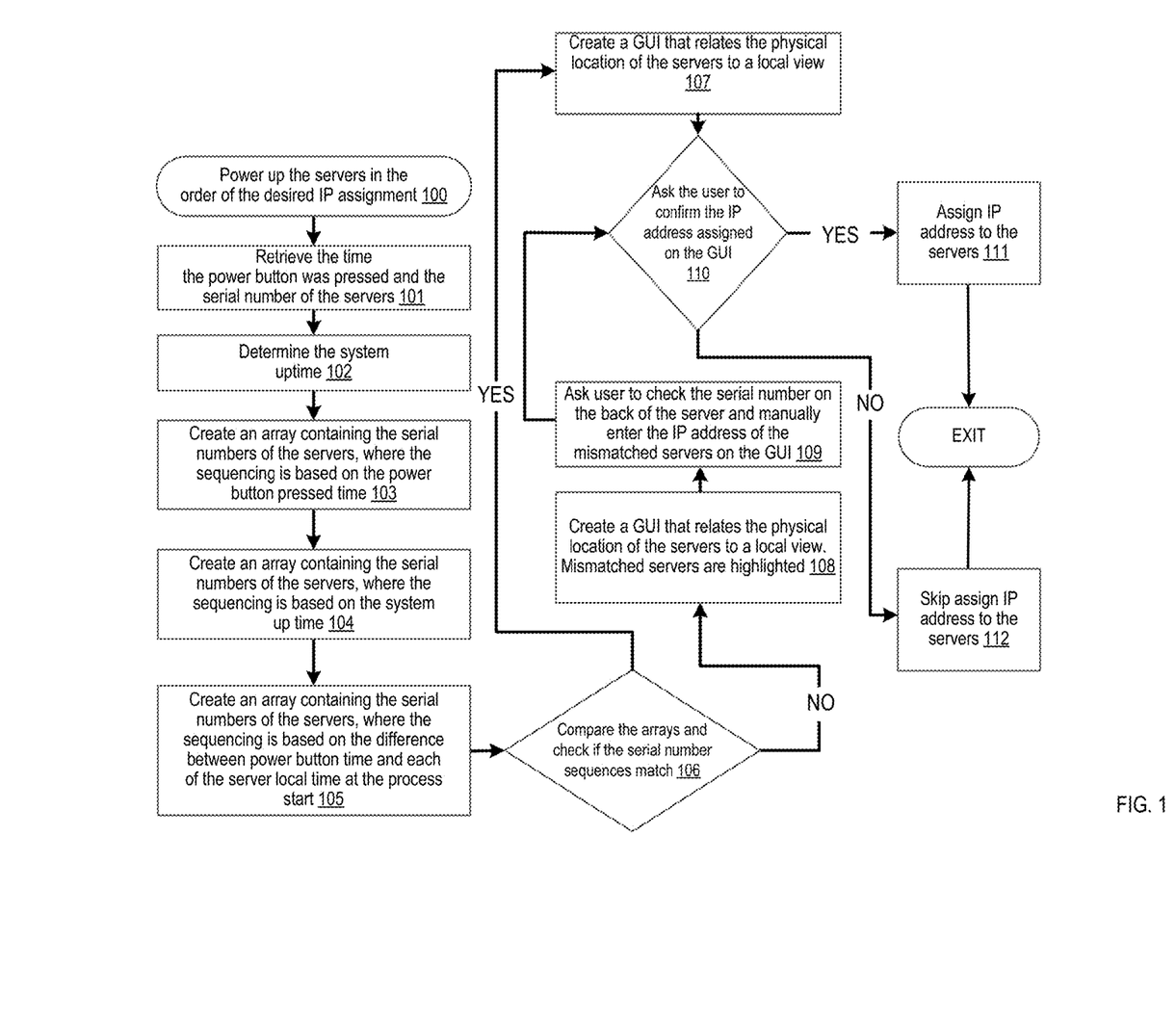
FIG. 1 illustrates an example flow diagram for an IP assignment process for a server rack, in accordance with an example implementation.
Figure 3A:
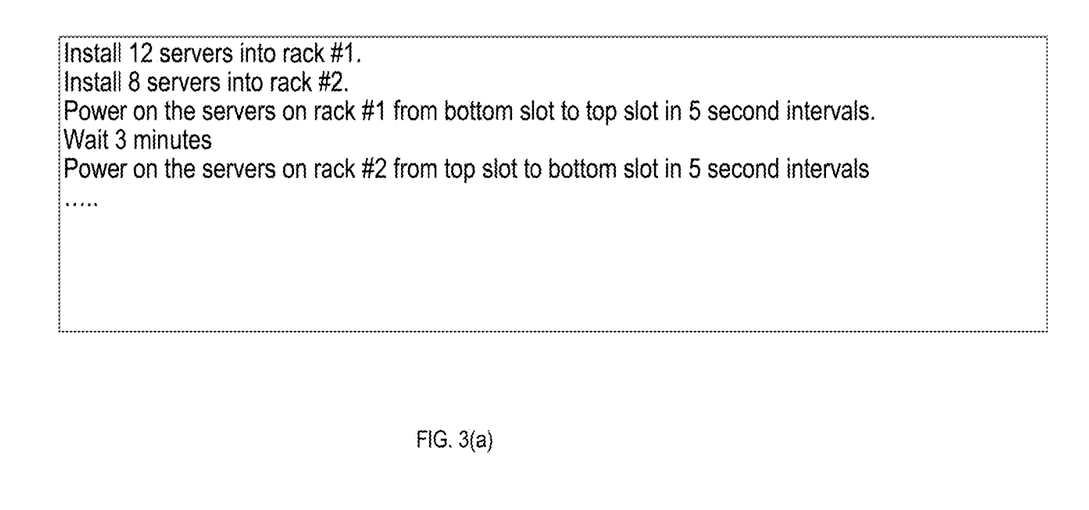
FIG. 3(a) illustrates examples of instructions that can be dispatched to the data center technician, in accordance with an example implementation.

FIG. 1 illustrates an example flow diagram for an IP assignment process for a server rack, in accordance with an example implementation. At first, instructions for a server rack associating location to power on order is dispatched to a data center technician (e.g., via a communication to a user equipment (UE) operated by a data center technician) as set by an administrator of a management system that manages the server racks as is illustrated in FIG. 3(a). After the data center technician mounts the servers in all the racks and connects up all cables, the data center technician ensures that all the servers are powered off. The data center technician then powers on the servers of the rack in sequence based on the physical location of the servers on the rack according to the desired IP address assignment at 100. For example, the data center technician installing the servers physically can power on the servers from the bottom of the rack to the top of the rack with 10 seconds apart from each power on until all servers have been powered on. If multiple racks are involved, the instructions can also involve delaying power on of a subsequent rack (e.g., one minute) before powering on the servers from the bottom of the next rack to the top of the next rack accordingly.

Then, the autodiscovery process of the deployment manager is executed to identify the available servers for deployment. The deployment manager can be activated from the data center technician sending a command from their user equipment to the data center management apparatus indicating that the instillation is complete, by asking the administrator to execute the deployment manager, or through other methods in accordance with the desired implementation.

At 101, the deployment manager collects information from using the desired protocol and tools (e.g., RedFish protocol, Intelligent Platform Management Interface (ipmi) tool, etc.) to retrieve information such as the power button pressed time and the server serial number. For example, the IPMI tool can be executed by the deployment manager to issue a ping Link-Local such as an Internet Protocol version 6 (IPv6) ping to determine the plurality of servers connected to the network. In example implementations, a ping Link-Local is issued rather than a normal ping (e.g., IPv4), because a normal ping requires the servers to already be set up with specific IP addresses. In example implementations, servers installed in a rack are connected to the same switch, and the switching connection layer can be pinged through a ping local to retrieve the local address of a server on a rack connected to a switch associated with the rack. Through utilizing a ping Link-Local, the second layer (switching connection layer) of the servers respond with the server assignments (e.g., local IP information) connected to the switch within the rack. Subsequently, the IPMI tool can be used to execute a protocol such as RedFish protocol to the local addresses associated with the servers to obtain server serial numbers, current system time of the server, power on time of the server, Operating System (OS) uptime, and so on. Thus, by utilizing the IPMI tool, communication can be conducted over the local area network (LAN) to the servers via a switch, and a ping Link-Local can be issued on LAN to determine server attributes in accordance with the desired implementation.

At 102, the deployment manager uses a process (e.g., ESXI command line interface) to determine the system uptime. The system uptime is determined from taking the difference between the current system time of the server, and the power on time of the server. Each server can be configured to provide the power on time and the current system time of the server through the process. Example implementations take the difference as each server may be configured with different times, or their internal clocks may be incorrect. The system uptime of the server is then used to determine which servers were powered on first.

However, the present disclosure is not limited to the above example implementation, and other information that can be collected from the deployment manager can also be utilized in accordance with the desired implementation.

The information can be stored in a database or in memory in array form or otherwise in accordance with the desired implementation. For example, at 103, the deployment manager creates an array containing the serial number of the servers, wherein the sequencing of the serial numbers in the array is based on the power button press time. At 104, the deployment manager creates an array containing the serial number of the servers, wherein the sequencing of the serial numbers in the array is based on the system up time. At 105, the deployment manager creates an array containing the serial numbers of the servers, wherein the sequencing is based on the difference between the power button time and each of the server local time at the process start.

At 106, the deployment manager compares the arrays and checks if the serial number sequences match. This process is used to compare the collected data to identify the physical location of the servers and assign a pre-allocated static IP address to the servers accordingly. In this process, the deployment manager determines the difference between the power button press time and the current system time to identify the location of the server. For example, for a set of instructions dispatched to the data center technician to power on the server from the bottom of the rack to the top of the rack, smaller values indicate that the server is located towards the bottom of the rack. This process is utilized as a normalizing step to account for situations in which the clock of the server is reset during shipment or installation.

Depending on the desired implementation, in a multiple rack installation scenario, large value differences between the normalized values can be used for differentiating the different group of servers across separate rack, such as a situation in which the time apart between racks are one minute but between servers are ten seconds.

Depending on the desired implementation, if the system uptime is available, the deployment manager can utilize the system uptime and power button press time to further validate the physical location of the server.

If the serial sequences match (Yes), the flow proceeds to 107, otherwise (No) the flow proceeds to 108.

Figure 2A:
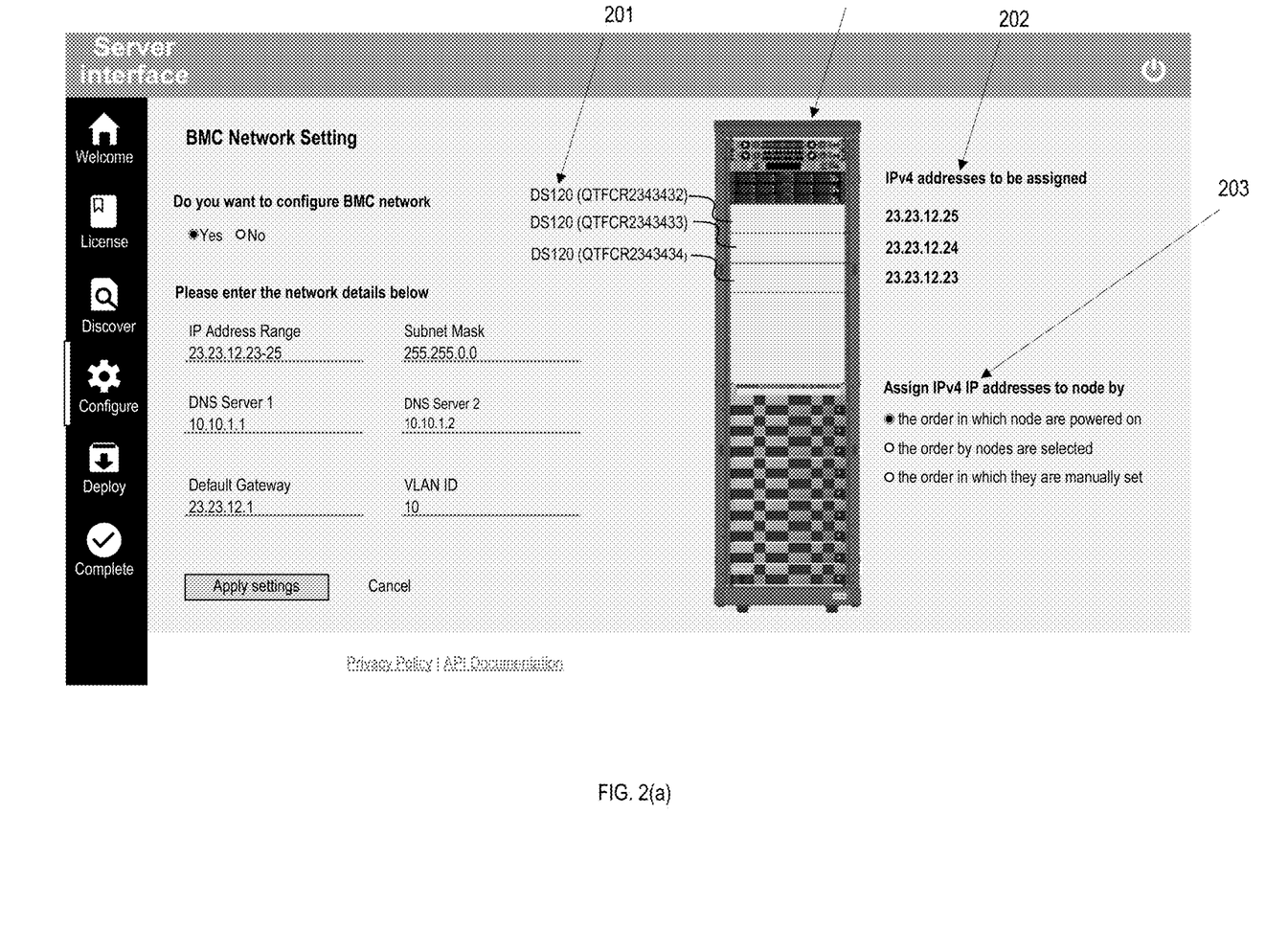
FIGS. 2(a) and 2(b) illustrate example screen shots of the GUI, in accordance with an example implementation.
Figure 2B:
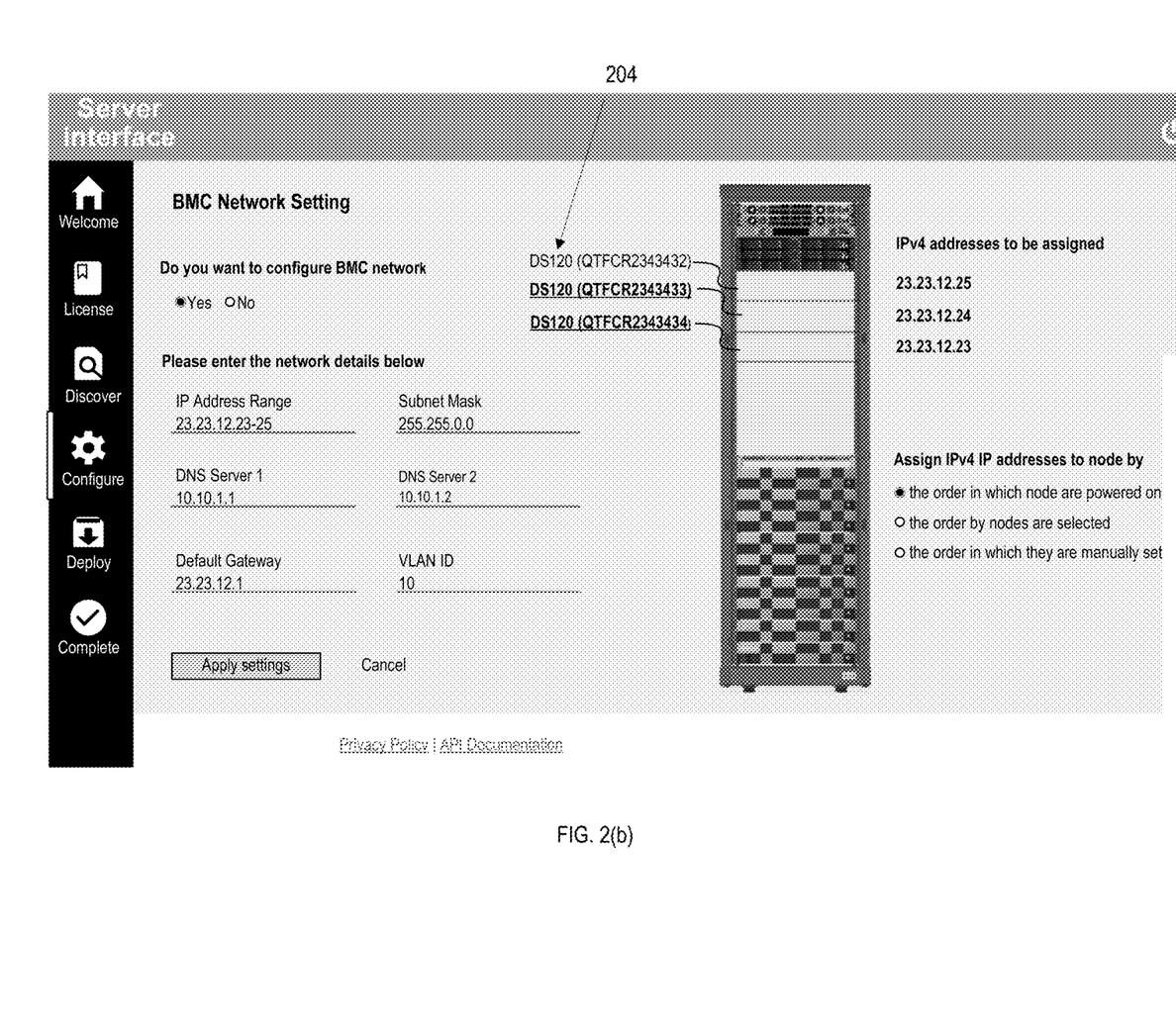

At 107, based on the results of 106, the deployment manager generates a graphical user interface (GUI) configured to show the position of the servers in a rack and allow the user to change the arrangement according to the desired implementation. FIGS. 2(*a*) and 2(*b*) illustrate an example screen shot of the GUI, in accordance with an example implementation.

At 108, the deployment manager creates a GUI that relates the physical location of the servers to a local view as illustrated in FIG. 2(*b*), only the mismatched servers will be highlighted, in accordance with the desired implementation.

At 109, depending on the desired implementation, the GUI can also prompt the user to check the serial number on the back of the server and manually enter the IP address of the mismatched servers on the GUI, in accordance with the desired implementation.

At 110, depending on the desired implementation, the GUI can also prompt the user to confirm the IP address assigned on the GUI. Depending on the desired implementation, the prompt can ask the user if the user wishes to confirm the IP address. If the response is yes (Yes), then the deployment manager can assign IP address to the servers at 111, otherwise (No), the deployment manager skips the assignment of the IP address to the servers at 112.

FIGS. 2(*a*) and 2(*b*) illustrate an example screen shot of the GUI, in accordance with an example implementation. As illustrated in FIG. 2(*a*), a rack 200 may involve several slots that are associated with multiple servers 201 that are powered on and detected by the deployment manager. The serial numbers of the servers and their corresponding slot in the rack can be indicated as shown in 201. IP addresses to be assigned 202 and be provided to the side to illustrate a suggested configuration for IP addresses to servers in the rack. In an example implementation, the assignment of the IPS addresses as illustrated at 202 can be provided in ascending order from the bottom slot to the top slot as default if the installation instructions indicate that the servers are to be powered on from bottom slot first to the top slot. An interface 203 can facilitate a user selection to assign or reassign IP addresses to each server node according to the desired implementation, such as the order in which nodes are powered on, the order by nodes are selected, and the order in which nodes are manually set.

In the example of FIG. 2(*b*), if there are mismatched nodes detected, the servers may be highlighted 204 to indicate that there is a mismatch between the power on order as determined from the current system time versus the operating system time. Any desired implementation to highlight the mismatch can be utilized.

Depending on the desired implementation, the assignment of IP addresses may be automatically assigned according to the power on order. In an example implementation, the default installation instructions can involve installing the servers in the rack, and power on the servers from the bottom slot of the rack to the top slot of the rack, so that the IP addresses can be assigned in ascending order (i.e. smaller number to larger number) from the server in the bottom slot to the server in the top slot as determined from the power on order. In another example implementation, the GUI can also be configured to receive a command (e.g., through a selection of a button in the GUI) to flip the order (not shown) from ascending order to descending order and vice versa, depending on the desired implementation.

FIG. 3(*a*) illustrates examples of instructions that can be dispatched to the data center technician, in accordance with an example implementation. Such instructions can be dispatched to user equipment operated by the data center technician and involves the rack(s) to be installed, the power on sequence, the time delay to conduct the sequence and the time delay between rack(s).

Figure 3B:
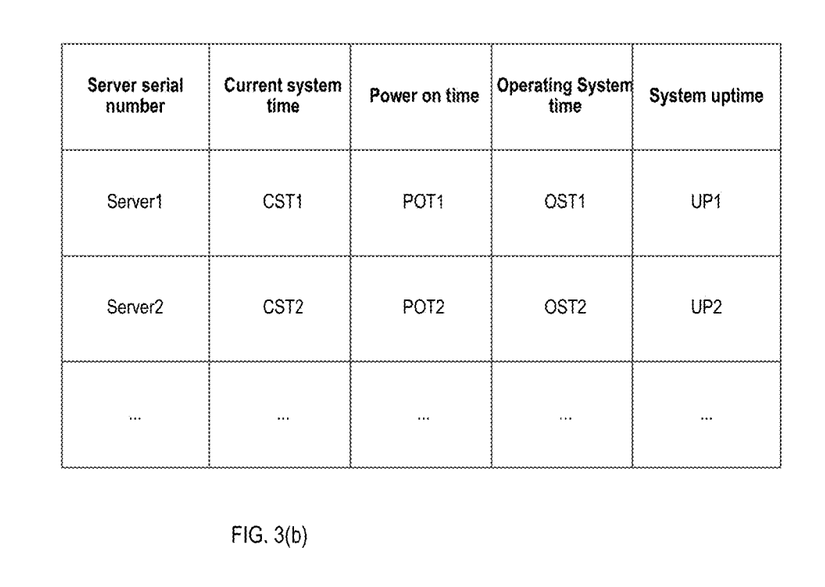
FIG. 3(b) illustrates example management information managed by the deployment manager, in accordance with an example implementation.

FIG. 3(*b*) illustrates example management information managed by the deployment manager, in accordance with an example implementation. The information collected can involve the server serial number, the current time indicated on the server, the power on time, and the operating system time. From the information provided, the system uptime can thereby be derived. The current time, power on time and operating system time can be provided in the form of time stamps, as a date and time, or in other forms in accordance with the desired implementation. The information about the power on time, serial numbers, system up times, and the operating system local time are collected by using the RedFish protocol through the IPMI tool. The information of FIG. 3(*b*) can thereby be utilized by the deployment manager to create data arrays for comparing the sequence of the server power-up time, the server uptime and each of the server local current time to determine the physical position of the server in the rack. The system uptime is derived for each of the servers, and a data array can be created that normalizes the servers to the server having the longest or shortest system uptime (e.g., takes a difference between the system uptime of the longest running server or shortest running server against the other servers), thereby indicating the power on order based on the normalized difference (e.g., server with longest uptime is associated with zero seconds, server with second longest uptime is associated with the difference between server with longest uptime and second longest uptime such as 5 seconds, and so on wherein the power on order is the order from smallest difference to largest difference) Such a procedure can also account for misconfigured servers having the wrong system time or date.

Depending on the desired implementation, system uptime can also be measured through using the operating system time. In such an example implementation, the difference between the operating system time and the power on time is utilized to determine the system uptime. Such a value can be utilized as the system uptime, or can be utilized to compare against the system uptime derived from the difference of the current system time versus the power on time. Additionally, operating system time is utilized to determine if the storage devices on the server (e.g., hard disk drives, flash drives) are operating and that the operating system has booted correctly. For example, if the operating system time cannot be obtained, then the server may be running but not actually operational. Further, mismatched system uptimes between using the operating system time versus the current system time versus the operating system time can also indicate that there may be potential hardware issues with the server. In addition, if the sequence of servers as determined from the system uptime from the current system time differs from the sequence of servers as determined from the system uptime from the operating system time, then instructions can be dispatched to the data center technician to power the servers back down and power them back up according to the previously sent instructions. Other instructions can also be utilized in accordance with the desired implementation.

Figure 3C:
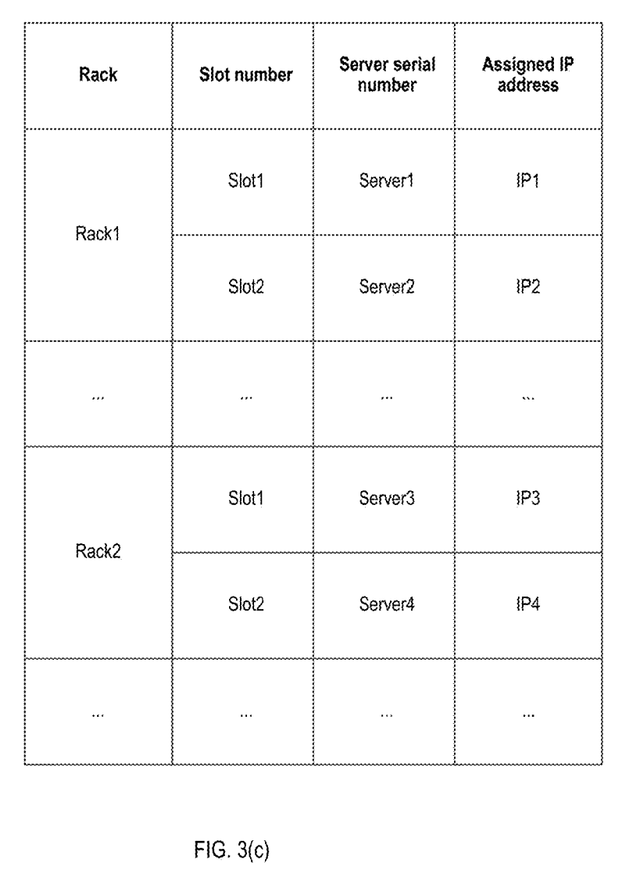
FIG. 3(c) illustrates an example of management information managed by the deployment manager for associating the IP addresses to racks and slot locations in the racks, in accordance with an example implementation.

FIG. 3(c) illustrates an example of management information managed by the deployment manager for associating the IP addresses to racks and slot locations in the racks, in accordance with an example implementation. Once the system uptimes are normalized, the server serial numbers can be associated with the racks and slots based on the power up instructions transmitted to the data center technician as illustrated in FIG. 3(a). This process can be automatically configured by the deployment manager from processing the instructions to determine the how the power on times are to be associated to racks or slots.

Figure 4:
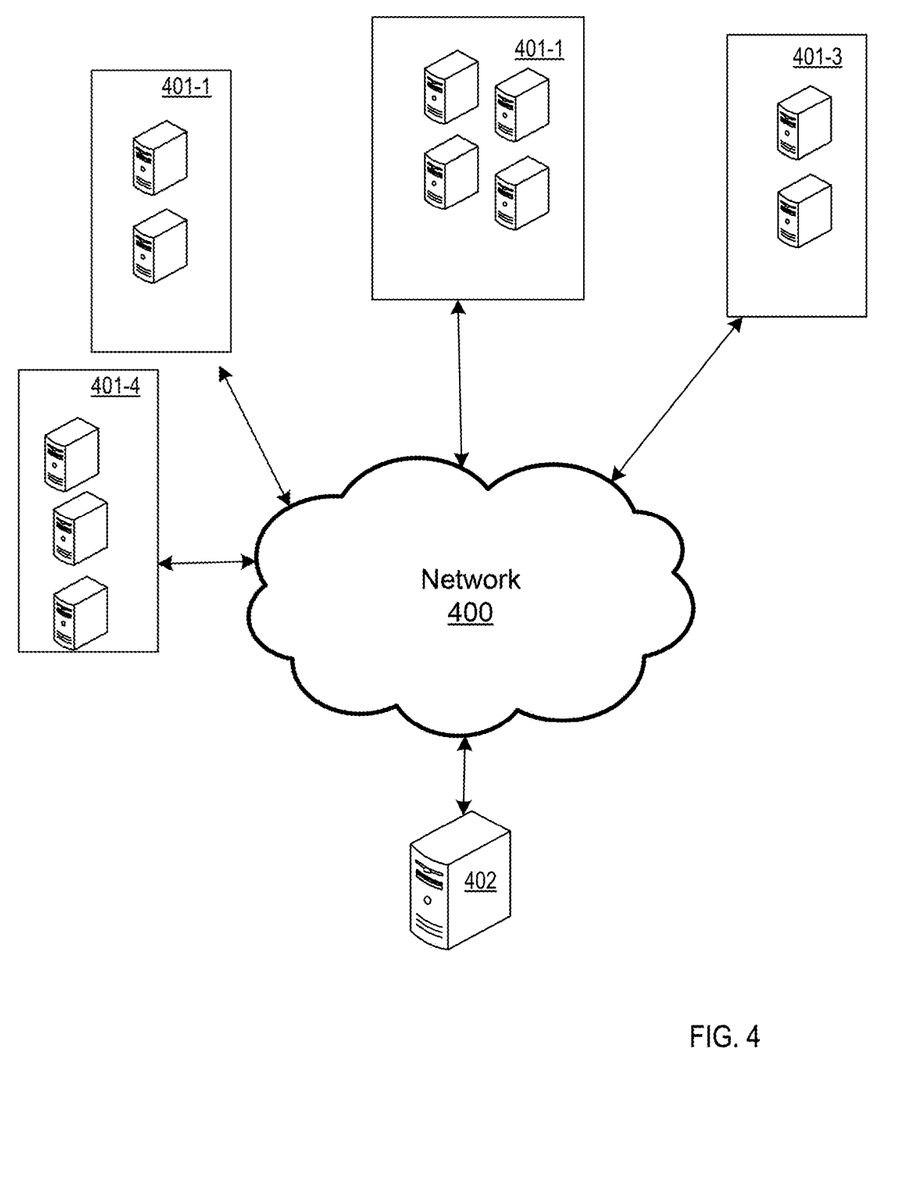
FIG. 4 illustrates an example data center system involving a plurality of racks and a data center management apparatus, in accordance with an example implementation.

FIG. 4 illustrates an example data center system involving a plurality of racks and a data center management apparatus, in accordance with an example implementation. One or more racks 401-1, 401-2, 401-3, and 401-4 contain one or more servers that are communicatively coupled to a network 400 via a switch in the rack or an external switch depending on the desired implementation, which is connected to a data center management system 402. Network 400 can involve a local area network (LAN) to facilitate connections between the servers on the rack and the data center management system 402, and also a wide area network (WAN) to connect the servers on the rack to the outside world once IP addresses are assigned for the WAN connection of the servers. The data center management apparatus 402 manages the deployment, execution, and maintenance of the servers in the racks 401-1, 401-2, 401-3, 401-4. As illustrated in FIG. 4, in example implementations, servers are deployed in a data center, with multiple servers (e.g., 30 or 40 servers) deployed within a rack. Each data center may have multiple racks. The data center management apparatus 402 is configured to scan the network to determine what servers are available in the network 400. However, to configure the servers in each rack to be outward facing for deployment, IP addresses need to be assigned to each server.

From the administrator side, the IP addresses can be assigned to any server as the servers can be represented logically. However, for maintenance and support operators that are on the floor of the data center, such operators need to know the physical location of the server corresponding to the IP address in order to facilitate support and maintenance. For example, if the administrator of the data center management apparatus 402 notes that the server at a particular IP address is blinking red, they need to be able to inform the maintenance and support operator as to where in the data center the server corresponding to the IP address is located.

In related art implementations, added specialized hardware is utilized in the rack with their own broadcasting protocols and configured to provide a light or other indication when pinged by the user device of a technician. However, such implementations add extra hardware costs to the data center. In contrast, example implementations described herein utilize the server itself to facilitate providing the physical location of the server within a rack to the management apparatus 402 without requiring any additional specialized hardware.

In example implementations as described herein, instructions are provided to the data center technicians to install the server into the rack, make the proper physical connections to implement the first layer of the rack, and execute a power on sequence in a particular order.

Figure 5:
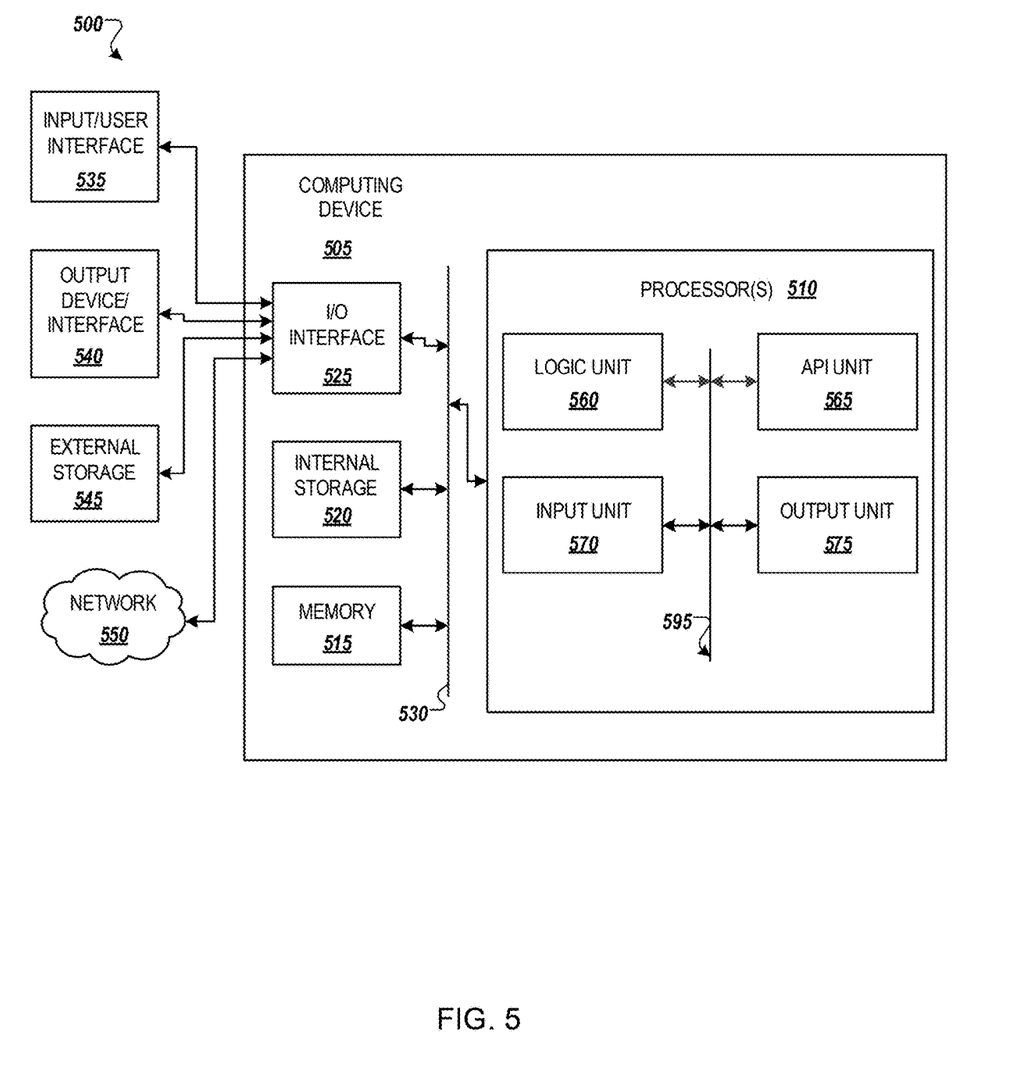
FIG. 5 illustrates an example computing environment with an example computer device suitable for use in some example implementations.

FIG. 5 illustrates an example computing environment with an example computer device suitable for use in some example implementations, such as a management apparatus 402 as illustrated in FIG. 4. Computer device 505 in computing environment 500 can include one or more processing units, cores, or processors 510, memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information or embedded in the computer device 505. I/O interface 525 is also configured to receive images from cameras or provide images to projectors or displays, depending on the desired implementation.

Computer device 505 can be communicatively coupled to input/user interface 535 and output device/interface 540. Either one or both of input/user interface 535 and output device/interface 540 can be a wired or wireless interface and can be detachable. Input/user interface 535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 540 may include a display, television, monitor, printer, speaker, braille, or the like. In some example implementations, input/user interface 535 and output device/interface 540 can be embedded with or physically coupled to the computer device 505. In other example implementations, other computer devices may function as or provide the functions of input/user interface 535 and output device/interface 540 for a computer device 505.

Examples of computer device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 505 can be communicatively coupled (e.g., via I/O interface 525) to external storage 545 and network 550 for communicating with any number of networked components, devices, and systems, including one or more computer devices of the same or different configuration. Computer device 505 or any connected computer device can be functioning as, providing services of, or referred to as a server, client, thin server, general machine, special-purpose machine, or another label.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computer device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Pert, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, and inter-unit communication mechanism 595 for the different units to communicate with each other, with the OS, and with other applications (not shown). The described units and elements can be varied in design, function, configuration, or implementation and are not limited to the descriptions provided. Processor(s) 510 can be in the form of hardware processors such as central processing units (CPUs) or in a combination of hardware and software units.

In some example implementations, when information or an execution instruction is received by API unit 565, it may be communicated to one or more other units (e.g., logic unit 560, input unit 570, output unit 575). In some instances, logic unit 560 may be configured to control the information flow among the units and direct the services provided by API unit 565, input unit 570, output unit 575, in some example implementations described above. For example, the flow of one or more processes or implementations may be controlled by logic unit 560 alone or in conjunction with API unit 565. The input unit 570 may be configured to obtain input for the calculations described in the example implementations, and the output unit 575 may be configured to provide output based on the calculations described in example implementations.

Processor(s) 510 can be configured to facilitate the functions of the deployment manager and execute all of the operations as shown in FIG. 1. For example, processor(s) 510 can be configured to issue a ping local over the LAN to determine a plurality of servers installed on one or more racks as described with respect to element 101 of FIG. 1.

Processor(s) 510 can be configured to retrieve power on time, current system time, and operating system (OS) uptime for each of the plurality of servers as described with respect to element 102 of FIG. 1 and determine a power on order for the plurality of servers as described with respect to elements 103 and 104 of FIG. 1.

Processor(s) 510 can be configured to determine physical locations of the plurality of servers within one or more racks based on installation instructions as illustrated in FIG. 3(a) and the power on order as illustrated in FIG. 3(b) and as described in FIG. 2(a).

Processor(s) 510 can be configured to assign internet protocol (IP) addresses to the plurality of servers based on the physical locations as illustrated in FIG. 3(c) and as described in FIG. 2(a). The IP addresses are then used by the servers as assigned by the processor(s) 510.

Processor(s) 510 can be configured to assign IP addresses to the plurality of servers based on the physical locations by assigning ranges of IP addresses to each of the one or more racks; and providing a graphical user interface (GUI) configured to indicate the physical location of the plurality of servers within the each of the one or more racks as illustrated in FIG. 2(a); and for a rack from the one or more racks, providing on the GUI an assignment of IP addresses within a range from the range of IP addresses associated with the rack for the plurality of servers within the rack based on the power on order for the rack as illustrated in the IP addresses to be assigned 203 of FIG. 2(a). The GUI can be configured to skip assigning the IP addresses to selected ones of the plurality of servers as described with respect to FIGS. 2(a) and 2(b).

Processor(s) 510 can be configured to assign the IP addresses to the plurality of servers based on the physical locations by assigning the IP addresses to the plurality of servers within slots of each of the one or more racks in ascending order from a bottom one of the slots to the top one of the slots within the each of the one or more racks as shown in FIGS. 2(a), 2(b) and 3(a) to 3(c). Depending on the desired implementation, the processor(s) 510 can be configured to provide graphical user interface (GUI) configured to receive a command to reverse the assignment of the IP addresses to descending order, and vice versa.

Processor(s) 510 can be configured to compare the power on order derived from the current system time with the power on order derived from the OS time. If they are mismatched, processor(s) 510 can be configured to transmit instructions to repower the plurality of servers associated with a rack of the one or more racks having the mismatch as described in FIG. 2(b). For example, instructions such as those in FIG. 3(a) can be automatically dispatched to turn off the affected servers and replace them or repower them for detection. In another example implementation, the instructions may be directed to shutting down the rack in its entirety. As illustrated in FIG. 2(b), processor(s) 510 can be configured to provide a graphical user interface (GUI) configured to highlight the mismatch in the rack of the one or more racks.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   issuing a ping Link-Local to determine a plurality of servers;
   retrieving power on time, current system time, and operating system (OS) uptime for each of the plurality of servers;
   determining a power on order for the plurality of servers;
   determining physical locations of the plurality of servers within one or more racks based on installation instructions and power on order; and
   assigning internet protocol (IP) addresses to the plurality of servers based on the physical locations.

2. The method of claim 1, wherein assigning IP addresses to the plurality of servers based on the physical locations comprises:
   assigning ranges of IP addresses to each of the one or more racks;
   providing a graphical user interface (GUI) configured to indicate the physical location of the plurality of servers within the each of the one or more racks; and
   for a rack from the one or more racks, providing on the GUI an assignment of IP addresses within a range from the range of IP addresses associated with the rack for the plurality of servers within the rack based on the power on order for the rack.

3. The method of claim 2, wherein the GUI is configured to skip assigning the IP addresses to selected ones of the plurality of servers.

4. The method of claim 1, wherein the assigning the IP addresses to the plurality of servers based on the physical locations comprises:
   assigning the IP addresses to the plurality of servers within slots of each of the one or more racks in ascending order from a bottom one of the slots to the top one of the slots within the each of the one or more racks.

5. The method of claim 4, further comprising:
   providing a graphical user interface (GUI) configured to receive a command to reverse the assignment of the IP addresses to descending order.

6. The method of claim 1, wherein for the power on order derived from the current system time being mismatched from the power on order derived from the OS time, transmitting instructions to repower the plurality of servers associated with a rack of the one or more racks having the mismatch.

7. The method of claim 6, further comprising:
   providing a graphical user interface (GUI) configured to highlight the mismatch in the rack of the one or more racks.

8. An apparatus managing a plurality of servers installed on one or more racks, the apparatus connected to the plurality of servers over a local area network (LAN), the apparatus comprising:
   a processor, configured to:
   issue a ping Link-Local over the LAN to determine the plurality of servers;
   retrieve power on time, current system time, and operating system (OS) uptime for each of the plurality of servers;
   determine a power on order for the plurality of servers;

determine physical locations of the plurality of servers within one or more racks based on installation instructions and power on order; and assign internet protocol (IP) addresses to the plurality of servers based on the physical locations.

\* \* \* \* \*